United States Patent [19]

Pitsch et al.

[11] Patent Number: 4,779,487
[45] Date of Patent: Oct. 25, 1988

[54] ALL-WHEEL LIMITED SLIP DIFFERENTIAL SYSTEM IN THE POWER TRAIN OF A MOTOR VEHICLE

[75] Inventors: Hermann Pitsch, Wimsheim; Klaus Gausrab, Ostfildern; Robert Müller, Mönsheim, all of Fed. Rep. of Germany

[73] Assignee: Dr. Ing. h.c.F. Porsche Aktiengesellschaft, Fed. Rep. of Germany

[21] Appl. No.: 27,245

[22] Filed: Mar. 18, 1987

[30] Foreign Application Priority Data

May 14, 1986 [DE] Fed. Rep. of Germany ....... 3616236

[51] Int. Cl.$^4$ ................................ F16H 1/44
[52] U.S. Cl. ...................... 74/710.5; 74/802; 180/249
[58] Field of Search ........... 74/710.5, 711, 789, 74/790, 791, 714, 705, 688, 792, 802; 180/248, 249

[56] References Cited

U.S. PATENT DOCUMENTS

| 2,495,515 | 1/1950 | Foley | 74/789 |
| 2,996,932 | 8/1961 | Gsching | 74/789 |
| 3,374,692 | 3/1968 | Kitch et al. | 74/688 |
| 3,709,314 | 1/1973 | Hickey | 180/249 |
| 3,923,113 | 12/1975 | Pagdin | 74/711 |
| 4,497,219 | 2/1985 | Elsher | 74/790 |
| 4,520,691 | 7/1985 | Rodler, Jr. | 74/790 |
| 4,541,503 | 9/1985 | Akutagawa et al. | 180/249 |
| 4,644,823 | 2/1987 | Mueller | 74/710.5 |
| 4,691,593 | 9/1987 | Mueller | 74/714 |

FOREIGN PATENT DOCUMENTS

| 3218830 | 5/1982 | Fed. Rep. of Germany . |
| 3223836 | 6/1982 | Fed. Rep. of Germany . |
| 3507490 | 3/1985 | Fed. Rep. of Germany . |
| 3611968 | 4/1986 | Fed. Rep. of Germany . |

Primary Examiner—Leslie A. Braun
Assistant Examiner—David Novais
Attorney, Agent, or Firm—Barnes & Thornburg

[57] ABSTRACT

An all-wheel limited slip differential system in the power train of the front axle and the rear axle of a motor vehicle has an intermediate planetary transmission in the direct through drive and a braking device that is engageable at its planetary carrier. A braking member is connected with the planetary carrier and the counter-braking member interacting with it is connected with the output shaft to the rear axle in a torsionally fixed manner. In order to keep the required braking moment and the braking device small, the ratio of the gear to the braking device is significantly higher than the ratio for the direct through drive.

6 Claims, 5 Drawing Sheets

ALL-WHEEL LIMITED SLIP DIFFERENTIAL SYSTEM IN THE POWER TRAIN OF A MOTOR VEHICLE

BACKGROUND AND SUMMARY OF THE INVENTION

The present invention relates to an all-wheel drive for a motor vehicle, having a first axle that can be driven continuously by the vehicle engine or its gear shift transmission and an automatically operating limited slip differential system. This differential system brings two vehicle wheels of a second axle into driving connection with the first axle. The differential system has a planetary transmission formed of sun gear wheels, planetary wheels and a planetary carrier that has a drive through ratio which only slightly deviates from 1:1. The system also has a braking device which is applied to the planetary transmission at a high ratio.

A limited slip differential system of the above type is described in German Pat. No. 35 07 490, corresponding to commonly-owned U.S. application Ser. No. 835,381 now U.S. Pat. No. 4,691,593. That planetary transmission comprises an inlet sun gear wheel connected with the driving axle; an outlet sun gear wheel having a slightly smaller number of teeth that is coaxial and adjacent to said inlet gear wheel and is connected with the axle to be driven; and planetary wheels that are simultaneously engaging with both sun gear wheels and are disposed at a planetary carrier. Bearing bolts are mounted at the planetary carrier on which, as the braking members, brake shoes are disposed which act as centrifugal weights when the planetary carrier turns and with their braking surfaces place themselves against a fixed brake drum serving as the counterbraking member. Since the outlet sun gear wheel has one or two teeth less than the inlet sun gear wheel, the planetary carrier that has a gear ratio of, for example, 16:1 to the sun gear wheels, rotates continuously, even when the front axle and the rear axle run synchronously so that the limited slip differential system continuously results in a power loss even if it is slight. In addition, in order to achieve a synchronous running of the front axle and the rear axle, the pertaining angle drives must differ reciprocally with respect to the through drive ratio. For a motor vehicle with front wheel drive, if the inlet sun gear wheel has a number of teeth $z=32$ and the outlet gear wheel has a number of teeth $z=30$, the angle drive ratio to the front axle must be 8:32 and to the rear axle 8:30 in order to compensate the through drive ratio.

An objective of the present invention is to provide a limited slip differential system having an inlet sun gear wheel, an outlet sun gear wheel, and simultaneously engaging planetary wheels with a through drive ratio deviating from 1:1, in which a synchronous movement of the front axle and the rear axle occurs when the angle drive ratios are the same; and when there is a slip-free synchronous movement, a power loss in the limited slip differential system is avoided.

This and other objectives are achieved by the present invention by providing in an all-wheel limited slip differential system having an intermediate planetary transmission in the direct through drive, a braking device engageable at a planetary carrier, the braking device including a braking member connected with the planetary carrier in a torsionally fixed manner, and a counterbraking member connected in a torsionally fixed manner with an output shaft that is connected to one of the vehicle axles.

If a braking member that is connected with the planetary carrier interacts with a counterbraking member that, in a torsionally fixed way, is connected with the power train of the front axle and the rear axle, the whole limited slip differential system rotates along with these axles when the axles move synchronously. The planetary carrier, in this case, does not carry out a relative rotation. As a result, no braking moment is generated and therefore there is no power loss. A braking limited slip moment is not produced before the rotational speeds of the front axle and of the rear axle differ because only then will a relative rotation be produced between the braking member and the counterbraking member. For this reason, the angle drive ratios to the front axle and the rear axle may also be the same.

Other objects, advantages and novel features of the Present invention will become apparent from the following detailed description of the invention when considered in conjunction with the accompanying drawings.

DETAILED DESCRIPTION OF THE DRAWINGS

Figure 1:
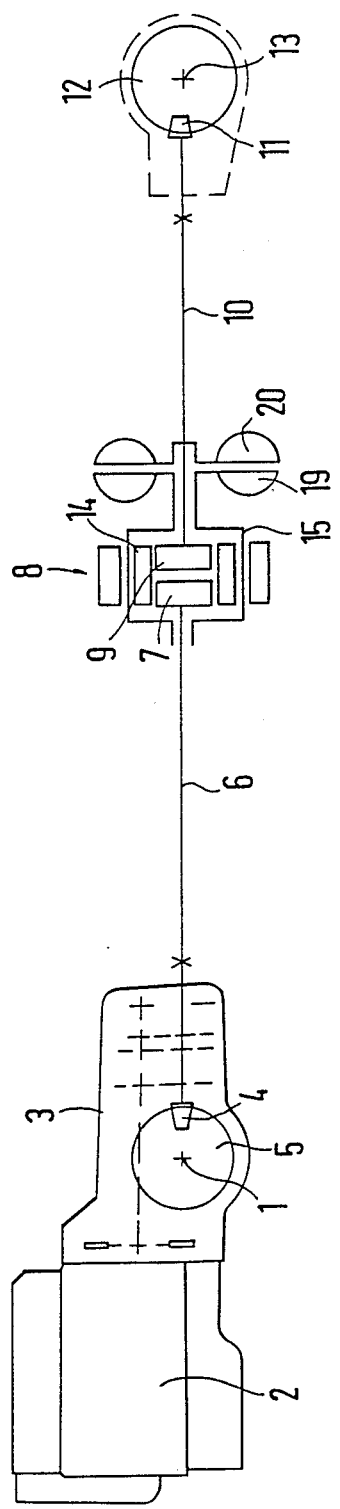
FIG. 1 is a schematic illustration of an all-wheel power train of a motor vehicle.

A driving motor 2 arranged on a motor vehicle close to the front axle 1 drives the front axle 1 by means of a gear shift transmission 3 mounted at the motor 2, via a bevel gear 4 and a plate gear wheel 5. From the bevel gear 4, a drive shaft 6 extends to an inlet sun gear wheel 7 of a planetary transmission 8. Coaxial to the inlet sun gear wheel 7 and adjacent to it, an outlet sun gear wheel 9 is disposed from which an output shaft 10 leads to a bevel gear 11 that drives a plate gear wheel 12 of the rear axle 13.

Figure 2:
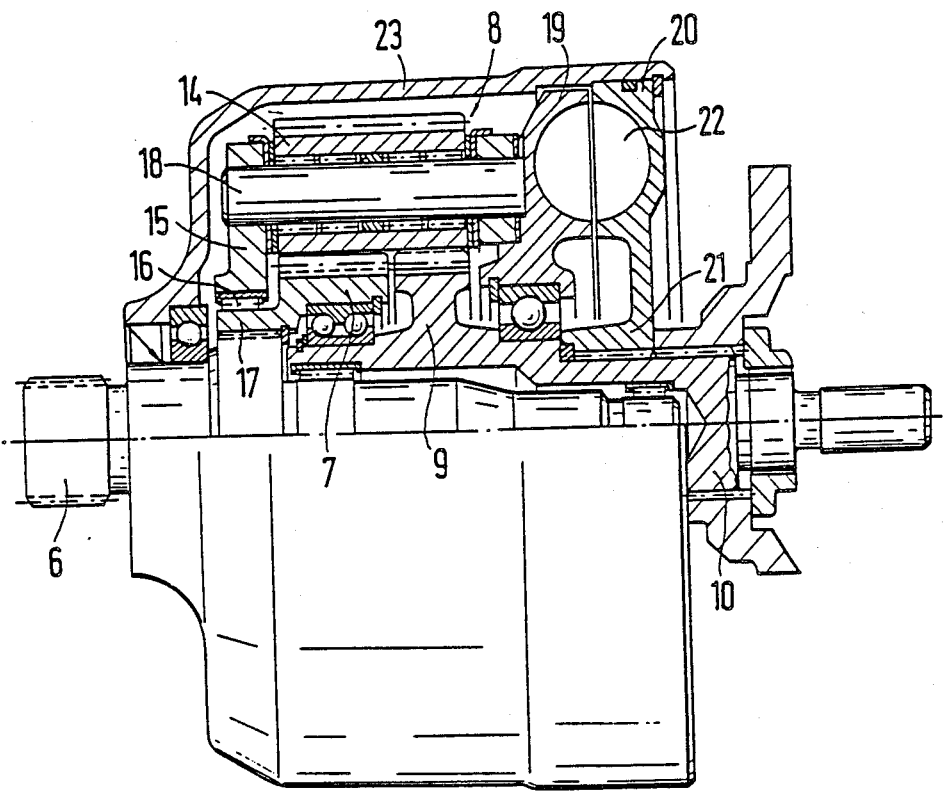
FIG. 2 is a longitudinal section through a preferred embodiment of the all-wheel limited slip differential system.

As best seen in FIG. 2, planetary wheels 14 engage both the inlet sun gear wheel 7 and the outlet sun gear wheel 9. The planetary wheels 14 are disposed at a planetary carrier 15 that itself, by means of a needle bearing 16, is disposed on a ring gear 17 of the inlet sun gear wheel 7 that is torsionally fixed on the drive shaft 6. For the bearing of the planetary wheels 14, bearing bolts 18 are fastened in the planetary carrier 15. A braking member 19 is fastened at the other ends of the bearing bolts 18, this braking member in preferred embodiments being a bladed half shell of a hydrodynamic clutch.

Figure 1A:
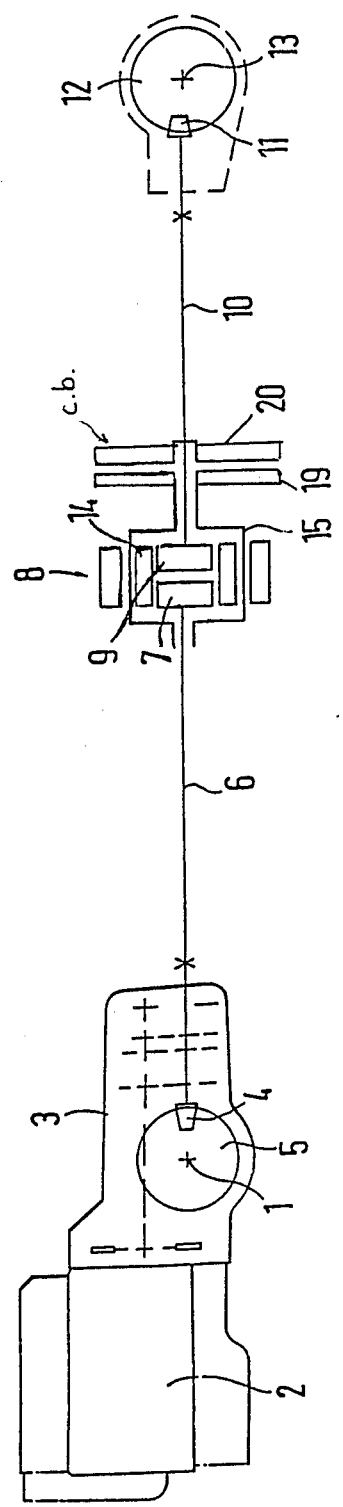
FIGS. 1a–1c are schematic illustrations of alternate preferred embodiments of an all-wheel power train similar to FIG. 1 but with different brakes.
Figure 1B:
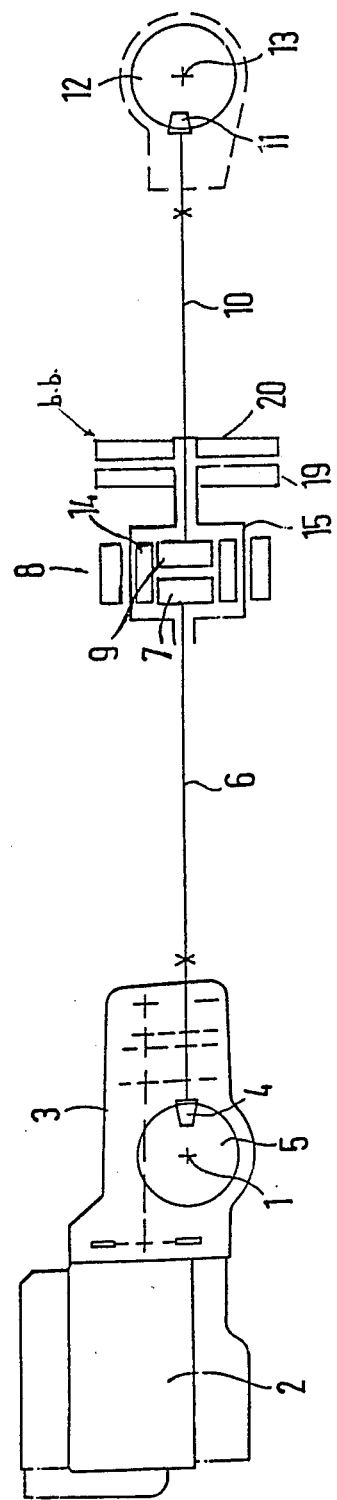
Figure 1C:
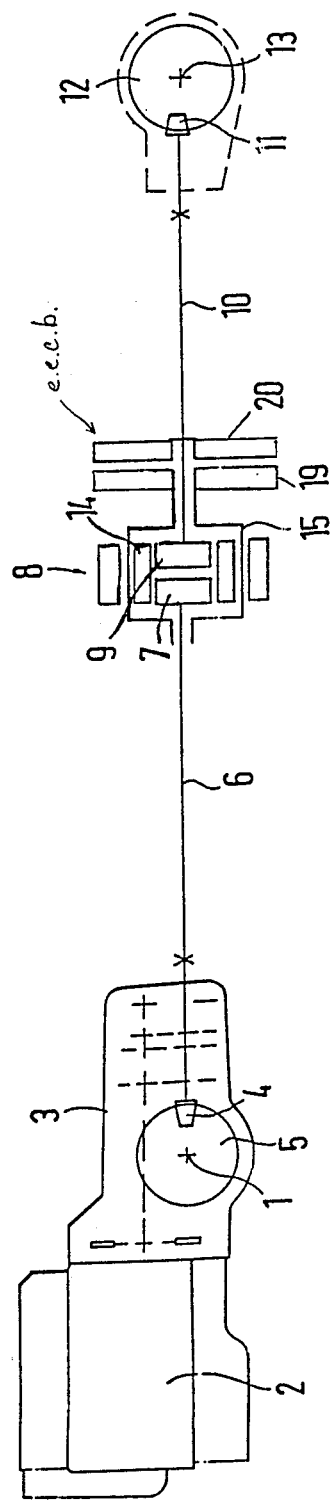

In FIG. 1a, the brake is schematically depicted as a centrifugal brake (c.b.); in FIG. 1b, the brake is a band brake (b.b.); in FIG. 1c, the brake is an electrical eddy current brake (e.e.c.b.).

Referring again to FIG. 2, another bladed half shell acts as the counterbraking member 20 and is fastened with a hub 21 on the output shaft 10 by means of a serration connection. Both half shells together form a torus-shaped flow space 22 that is filled with hydraulic fluid. The counterbraking member 20 is centered and sealed in a cylindrical housing 23 that also encloses the braking member 19 and the planetary transmission 8 and is disposed and sealed on the driving shaft 6.

In the illustrated preferred embodiment, the inlet sun gear wheel 7 has a number of teeth $z=32$; the outlet sun gear wheel 9 has a number of teeth $z=30$, so that the ratio for the direct through drive becomes 16:15. The gear ratio to the planetary carrier 15 is 16:1. If a rotational speed difference occurs between the front axle 1 and thus an equally large rotational speed difference between the driving shaft 6 and the output shaft 10, the planetary carrier 15 rotates at 16 times that rotational speed difference. By means of the relative rotation of the braking member 19 with respect to the counterbraking member 20, a braking moment is built up that corresponds to the rotational speed difference and causes a synchronous movement of the front axle 1 and the rear axle 13. However, when the front axle 1 and the rear axle 13 are moving synchronously, the whole limited slip system rotates along with them, so that the planetary carrier 15 does not carry out a relative rotation. Thus, no braking moment with resultant power loss will be generated when the axles move synchronously.

Because of the progressively rising hydrodynamic braking moment, the limited slip moment is kept low for low slip values. The motor vehicle is easily steerable and an ABS system is fully operable. When there are high slip values, which occur for example, when the wheels of the front axle 1 spin on ice, and the wheels of the rear axle 13 are on a gripping asphalt, the limited slip moment rises steeply and makes possible a problem-free starting.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. An all-wheel limited slip differential system in a power train of a front axle and a rear axle of a motor vehicle, said system having an intermediate planetary transmission in a direct through drive and a braking device that is engageable at a planetary carrier, the gear ratio for the direct through drive deviating slightly from 1:1, but the gear ratio to the braking device being significantly higher, wherein:

said braking device includes a braking member connected with the planetary carrier in a torsionally fixed manner, and a counterbraking member for interacting with said braking member, said counterbraking member being connected in a torsionally fixed manner with an output shaft connected to one of said axles, and wherein said braking device is automatically operable with its braking moment increasing progressively with increasing rotational speed difference between the planetary carrier and the output shaft.

2. A limited slip differential system according to claim 1, wherein the planetary transmission includes an inlet sun gear wheel that is connected with a driving shaft in a torsionally fixed manner, an outlet sun gear wheel having a slightly smaller number of teeth than said inlet sun gear wheel and is coaxial and adjacent to said inlet sun gear wheel and is connected with an output shaft, and planetary wheels disposed at the planetary carrier, said planetary wheels engaging jointly with the two sun gear wheels.

3. A limited slip differential system according to claim 1, wherein the braking member and the counterbraking member form an electrical eddy current brake.

4. A limited slip differential system according to claim 1, wherein the braking member and the counterbraking member form a hydrodynamic clutch.

5. A limited slip differential system according to claim 4, wherein the braking member and the counterbraking member are bladed half shells that enclose an oil-filled torus-shaped flow space.

6. A limited slip differential system according to claim 5, including a substantially cylindrical housing that encloses the limited slip differential system, and is connected on at least one of a driving shaft and the output shaft, said counterbraking member being fastened in a centered and sealed manner in said housing.

* * * * *